United States Patent [19]

Cooke et al.

[11] 4,118,709

[45] Oct. 3, 1978

[54] DIGITAL TO GRAPHIC CHARACTER GENERATOR

[75] Inventors: Gordon R. Cooke; Kevin T. Franklin, both of San Diego, Calif.

[73] Assignee: The United States of America as represented by the Secretary of the Navy, Washington, D.C.

[21] Appl. No.: 771,594

[22] Filed: Feb. 24, 1977

[51] Int. Cl.² ........................... G01D 9/00; G01S 7/60
[52] U.S. Cl. ................................. 346/33 R; 340/3 F; 346/33 EC; 346/62
[58] Field of Search ........................ 340/3 F, 324 AD; 343/5 PC; 346/23, 33 R, 33 EC, 34, 62

[56] References Cited

U.S. PATENT DOCUMENTS

| | | | |
|---|---|---|---|
| 3,714,663 | 1/1973 | Smith | 346/23 |
| 3,803,629 | 4/1974 | Walsh et al. | 346/33 R |

*Primary Examiner*—Richard A. Farley

*Attorney, Agent, or Firm*—Richard S. Sciascia; Ervin F. Johnston; James O. Skarsten

[57] ABSTRACT

In a device for graphically representing characters encoded in a digital signal, a writing element adapted to sweep across a recording medium at selected intervals is enabled by a timing means to selectively mark the recording medium during a selected series of sweeps, and a decoding means receives the digital signal and provides segment select signals, which specify a combination of segments from a group of segments which may graphically represent each of the characters in the digital signal. The outputs of the timing means and the decoding means are coupled to a network of logic elements to generate a signal which is coupled to the writing element, whereby the writing element selectively marks the recording medium during the series of sweeps to form the segments representing each of the characters.

10 Claims, 9 Drawing Figures

FIG. I

DIGITAL TO GRAPHIC CHARACTER GENERATOR

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The invention herein disclosed and claimed pertains generally to apparatus for graphically representing characters encoded in a digital signal, and more particularly pertains to such apparatus wherein the characters in the digital signal comprise information related to graphically represented data.

It is common practice to record data, for example, data obtained from sonar equipment tracking a target, by employing a recording system in which a stylus or other writing element sweeps across recording paper or other medium in generally linear fashion at selected intervals, the paper moving in a direction orthogonal to the motion of the stylus. Various means are presently available for use with these types of recording systems for recording timing or other information related to the data, upon the same recording medium, by selectively controlling successive linear sweeps of the stylus. Such means may be employed, for example, to imprint timing information along side recorded data to show a relative comparison between the times at which different data was recorded. Some of such means, however, may not be structured to show real time, the time at which recorded data actually was obtained. Other of such means may comprise relatively complicated arrangements of digital memories and storage circuits. Such presently available means may also be unadaptable for use generally as a digital to graphic character generator, which receives characters in digital form and represents them in graphic form, the characters having no relation to any data information.

SUMMARY OF THE INVENTION

A simplified apparatus for graphically representing a plurality of characters encoded in a digital signal is provided with a recording means comprising a writing element and a recording medium, wherein the writing element sweeps across the medium at selected intervals. The apparatus is further provided with a timing means which enables the writing element to selectively mark the recording medium during a selected series of sweeps, and a decoding means which receives the digital signal and generates segment select signals which specify the combination of segments from a group of segments for representing each of the characters. Outputs from the timing means and the decoding means are received by a network of logic elements which perform logic operations to generate a character record signal which causes the writing element to selectively mark the recording medium during the series of sweeps, whereby the segments for representing each of the characters is formed. Embodiments of the invention may be usefully employed to record timing or time code information on the same recording medium on which data, such as acoustic data concerning a target tracked by sonar, is recorded or represented. The time code information is in real time, whereby it denotes the time at which recorded data was actually obtained. However, it is by no means intended to limit the scope of the invention by such useful embodiments.

OBJECTS OF THE INVENTION

An object of the invention is to provide a new and improved means for providing graphic representations of characters encoded in a digital signal.

Another object of the invention is to provide a simplified means for graphically recording digital information related to data from a data source which employs the same recording system used to record or represent the data.

Another object of the invention is to provide a new and improved means for recording timing information on a graphic recording of data representing information concerning a target tracked by sonar, wherein the timing information shows the actual times at which the sonar system generated the data.

These and other objects of the invention will become more readily apparent from the ensuing specification when taken together with the drawings.

DESCRIPTION OF THE PREFERRED EMBODIMENT

Figure 1:
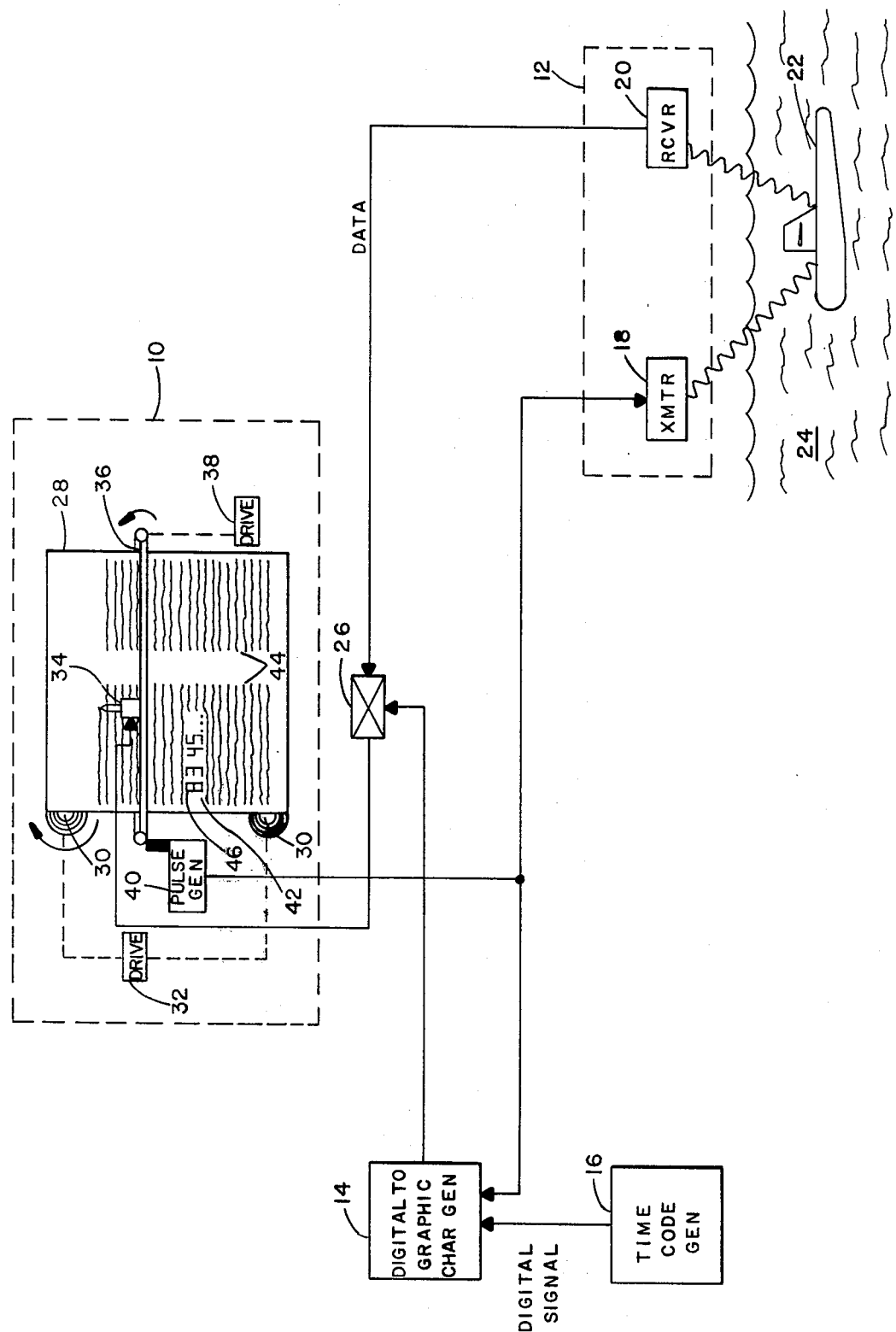
FIG. 1 is a block diagram of a data recording system with which an embodiment of the invention may be used.

Referring to FIG. 1, there is shown a recording system 10 for graphically representing data from a data source 12, and also for representing characters encoded in a digital signal, which is coupled to digital to graphic character generator 14 from a source of digital information 16. Data source 12 may comprise a sonar system, wherein periodic energy pulses from a transmitter 18 are reflected back to receiver 20 to provide acoustic data concerning a target 22 moving through an ocean media 24. Digital information source 16 may comprise a time code generator, and the digital signal may comprise eight numerical characters encoded in BCD (Binary Coded Decimal) form which show real time, or the date and time at which sonar data concerning target 22 was actually obtained and recorded. Character generator 14 generates a character record signal in response to the digital signal and couples it through formatting switch 26, to which the data from data source 12 is also coupled.

Recording system 10 is provided with a recording medium 28 such as paper or tape, which is moved vertically downward, or in a first degree of motion, by a roller drive system which may comprise drum rollers 30 and a drive unit 32. Stylus 34, which may comprise an ink, electrographic, or other suitable writing element for linearly marking medium 28, is coupled to a stylus sweeping mechanism, which may comprise a roller and belt assembly 36 and a drive unit 38, whereby stylus 34 sweeps across medium 28 at selected intervals from left to right in a horizontal direction, or in a second degree of motion generally orthogonal to the motion of medium 28. Each sweep begins at a time $T_O$ and continues for a time $T_s$, a pulse generator 40 generating a sweep pulse at the beginning of each sweep.

Whenever character generator 14 commences operation, switch 26 couples the character record signal to stylus 34 and uncouples data source 12 therefrom, whereupon window 42 occurs in recorded data 44, and the eight characters encoded in the digital signal, such as characters 46 partially shown in FIG. 1, are formed therein during a series of successive sweeps. The characters are arrayed in a horizontal row, and the gap between the fourth and fifth characters may be wider than gaps between other adjacent characters to conveniently distinguish between date information contained in the four left-most characters, and time information contained in the four right-most characters. The character record signal causes stylus 34 to imprint linear elements when the signal is logic 1, and disables stylus 34 when it is logic 0. Stylus 34 may be adaptable to mark medium 28 with varying intensity if the data from data source 12 is in analog form.

It may be noted that in a recording system wherein margins or columns are provided on medium 28, in which data 44 is not recorded or printed, generator 14 may be adapted to cause stylus 34 to form characters 46 within such margins or columns, eliminating the need for switch 26.

Figure 2:
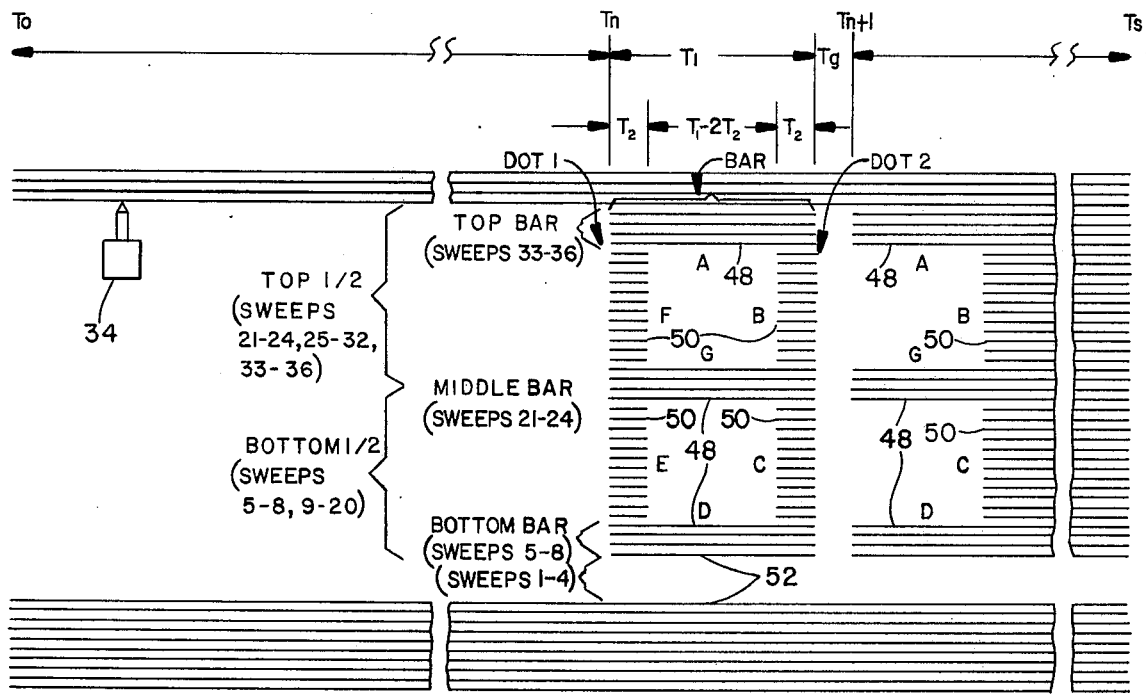
FIG. 2 is a diagram useful for understanding the manner in which characters may be generated by an embodiment of the invention.

Referring to FIG. 2, there are shown two characters 46 formed during a series of sweeps when character generator 14 is in operation. As is well known, any numerical character may be readily formed by selecting a combination of segments from a group of seven segments, three horizontal segments, denoted by A, G, and D in FIG. 2, and four vertical segments denoted by B, C, E and F, respectively. The character eight, for example, may be readily configured by combining all seven of the segments, whereas the character three may be configured by combining all the segments except E and F. Each of the horizontal segments comprises a vertical array of linear elements 48, and each vertical segment an array of elements 50, one element of a segment being imprinted during each sweep of a specified set of sweeps of the series. During sweep set (1–4), the first four sweeps of the series, stylus 34 is disabled, whereby space 52 is formed, setting characters 46 apart from data 44. During the set of sweeps (5–8), stylus 34 is enabled to form D segments occurring in the row of characters 46. In like manner, stylus 34 is enabled to form E and C segments during sweep set (9–20), G segments during sweep set (21–24), F and B segments during sweep set (25–32) and A segments during sweep set (33–36).

Further reference to FIG. 2 shows that each linear element 48 comprising a horizontal segment of the $n^{th}$ character is imprinted during a specified time period $T_1$, which commences at a time $T_n$ from the beginning of a sweep. Each linear element of vertical segments F or E is imprinted during a time period $T_2$, commencing at time $T_n$, and each linear element of vertical segments B or C is imprinted during a time period $T_2$, commencing at a time $T_n + (T_1 - T_2)$. At a time $T_n + T_1$ stylus 34 is disabled for a time period $T_g$ to provide a gap between adjacent characters.

FIG. 2 also shows BAR, DOT, TOP ½ and BOTTOM ½ nomenclature, which has a relationship to respective segments A–G hereinafter described.

Figure 3:
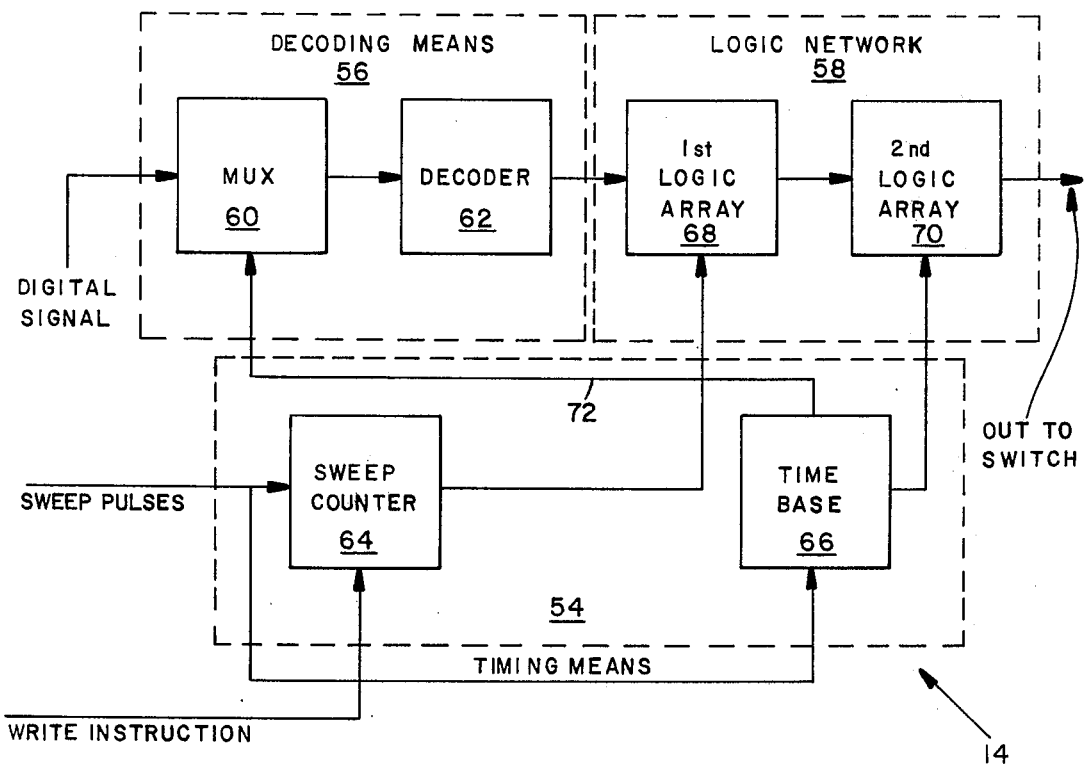
FIG. 3 is a block diagram showing a graphic character generator for an embodiment of the invention.

Referring to FIG. 3, there is shown digital to graphic character generator 14, comprising a timing means 54, a decoding means 56, and a network of logic elements, 58. Multiplexer 60 of decoding means 56 receives the eight characters 46 of the digital signal, and sequentially switches them, still in BCD form, to decoder 62. Sweep counter 64 of timing means 54 receives successive sweep pulses from pulse generator 40, which are also coupled to time base 66 of timing means 54. Logic network 58 comprises a first logic array 68 receiving inputs from decoder 62 and sweep counter 64, and a second logic array 70 receiving inputs from logic array 68 and from time base 66. The output of logic array 70 comprises the inverse of the character record signal, which is inverted by switch 26 to couple the character record signal to stylus 34. Address lines 72 are coupled from time base 66 to multiplexer 60 to control the switching thereof.

Figure 4:
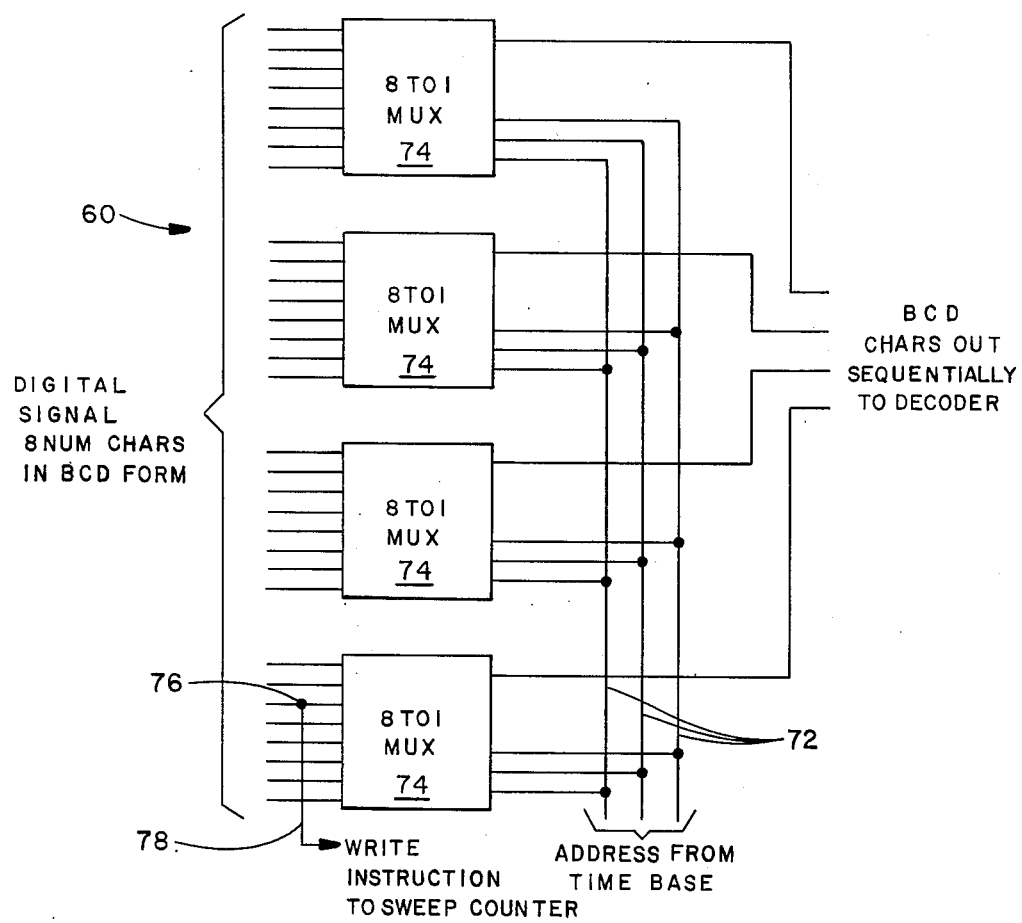
FIG. 4 is a schematic diagram showing a multiplexer for the embodiment of FIG. 3.

Referring to FIG. 4, there is shown multiplexer 60 comprising four eight-to-one multiplexing elements 74, each of which may comprise a standard integrated circuit element and which receives a three-bit address code from time base 66 through address lines 72. At time $T_n$ of each successive sweep of the sweep series, time base 66 couples the three-bit address code for the $n$th character 46 to multiplexer elements 74 for a time period $T_D$, whereby each character 46 encoded in the digital signal is sequentially switched out of multiplexer 60 once during each of the sweeps of the series, each of the characters still being in B C D form.

Referring further to FIG. 4, there are shown thirty two input terminals receiving the eight characters of the digital signal in parallel form, the logic states of respective terminals continuously changing as time code generator 16 upgrades the time represented in the digital signal. To commence operation of character generator 14 at the beginning of each time increment P, a terminal 76, the input terminal which goes to logic 1 at the beginning of each such increment, may be connected to sweep counter 64 through a line 78 to couple write instructions thereto. P may be 10 minutes, 1 minute or any other time increment suitable to reference the obtained data.

Figure 5:
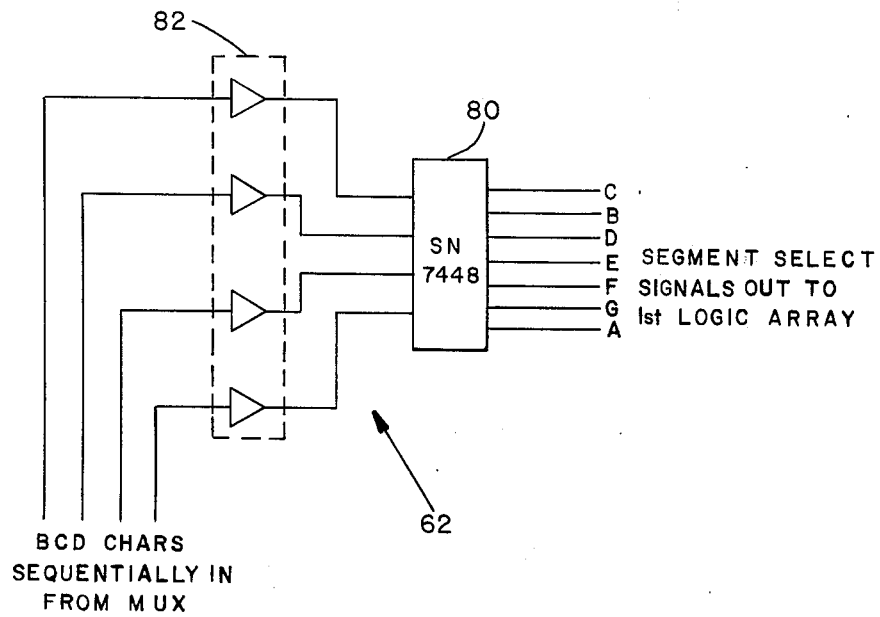
FIG. 5 is a schematic diagram showing a decoder for the embodiment of FIG. 3.

Referring to FIG. 5, there is shown decoder 62, wherein a BCD to seven-segment decoder 80 receives the sequential B C D output of multiplexer 60 through amplifier 82. Seven-segment decoder 80 may be a standard integrated circuit element, such as element SN7448 if generator 14 is transistor-transistor logic. Decoder 80 sequentially represents each character in the form of a segment select signal as it is received, whereby at a time $T_n$ of each sweep of the sweep series, the $n$th character 46 is represented in the form of such signal for a time $T_D$. Each segment select signal comprises a seven bit binary code specifying the combination of segments required to graphically represent a character. For example, to represent the character three, the A, B, C, D and G bits of the corresponding segment select signal would be logic 1, and the E and F bits would be logic 0.

Figure 6:
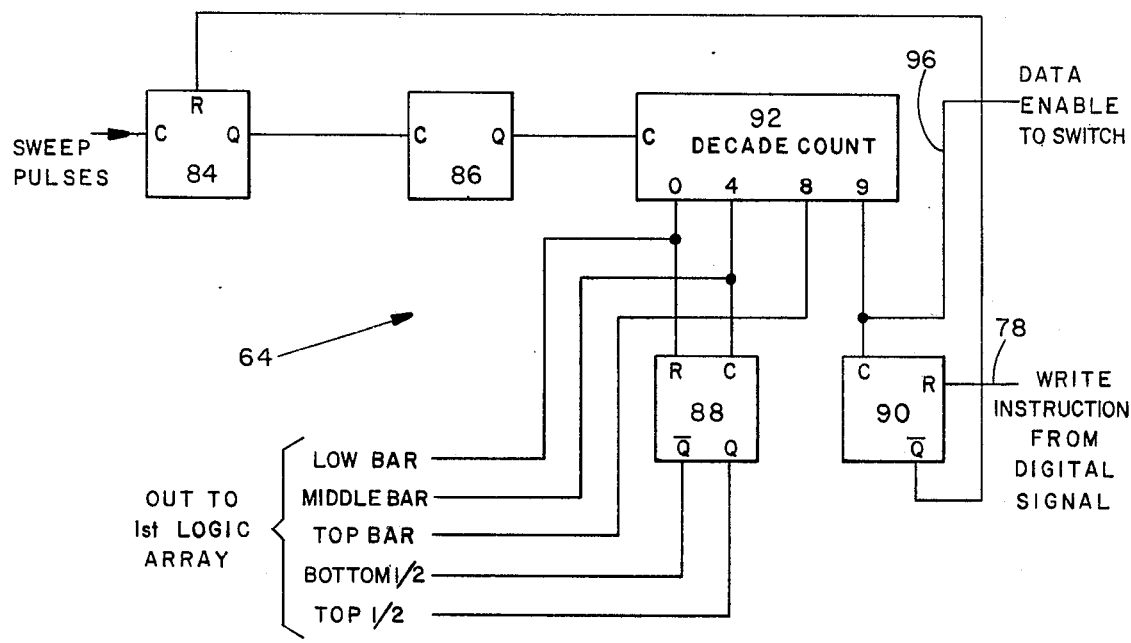
FIG. 6 is a schematic diagram showing a sweep counter for the embodiment of FIG. 3.

Referring to FIG. 6, there is shown sweep counter 64 comprising flip-flops 84, 86, 88, and 90, and a decade or 10-counter 92, all of which may comprise standard integrated circuit elements. The reset terminals of each of the components shown in FIG. 6 is denoted by R, each of the outputs by Q, each of the inverted outputs by $\overline{Q}$, and each of the clock terminals by C. The R terminal of flip-flop 90 receives the aforementioned write instruction through line 78 at the beginning of each period P so that its output $\overline{Q}$ goes to logic 1, resetting flip-flop 84. When flip-flop 84 is reset, it is enabled to be clocked by successive sweep pulses coupled to its C terminal from pulse generator 40, whereupon character generator 14 commences operation. Flip-flops 84 and 86 are connected as a divide-by-four, so that counter 92 is clocked once for every four sweeps of stylus 34 across medium 28, and may count a series of forty sweeps during which each of the characters 46 is graphically represented. The BOTTOM BAR output of sweep counter 64 is logic 1 during sweep set (5–8), the MIDDLE BAR output is logic 1 during sweep (21–24), and the TOP BAR output is logic 1 during sweep set (33–36). Consequently, a BOTTOM BAR logic 1 condition defines the enabling of stylus 34 to form D segments, a logic 1 MIDDLE BAR defines the enabling of stylus 34 to form G segments, and a TOP BAR logic 1 defines the enabling of stylus 34 to form A segments. Flip-flop 88 is reset on the fifth sweep, whereupon its $\overline{Q}$ terminal, coupled to the BOTTOM½ output, goes to logic 1 during sweeps sets (5–8) and (9–20). Similarly, on the twenty-first sweep flip-flop 88 is clocked so that its Q terminal, coupled to the TOP ½ output, goes to logic 1 during sweep sets (21–24) and (25–36). By referring back to FIG. 2, it may be noted that the condition logic 1 BOTTOM ½, logic 0 BOTTOM BAR indicates sweep set (9–16) and therefore defines the enabling of stylus 34 to form E and C segments. Similarly, a logic 1 TOP½, logic 0 MIDDLEBAR, logic 0 TOPBAR defines the enabling of stylus 34 to form F and B segments. FIG. 6 further shows flip-flop 90 clocked by the forty-first sweep of the series, whereupon $\overline{Q}$ of flip-flop 90 goes to logic 0, halting operation of character generator 14. Line 96, which remains at logic 1 when generator 14 is not in operation, is coupled to formatting switch 26, enabling data to be coupled to recording system 10.

Figure 7:
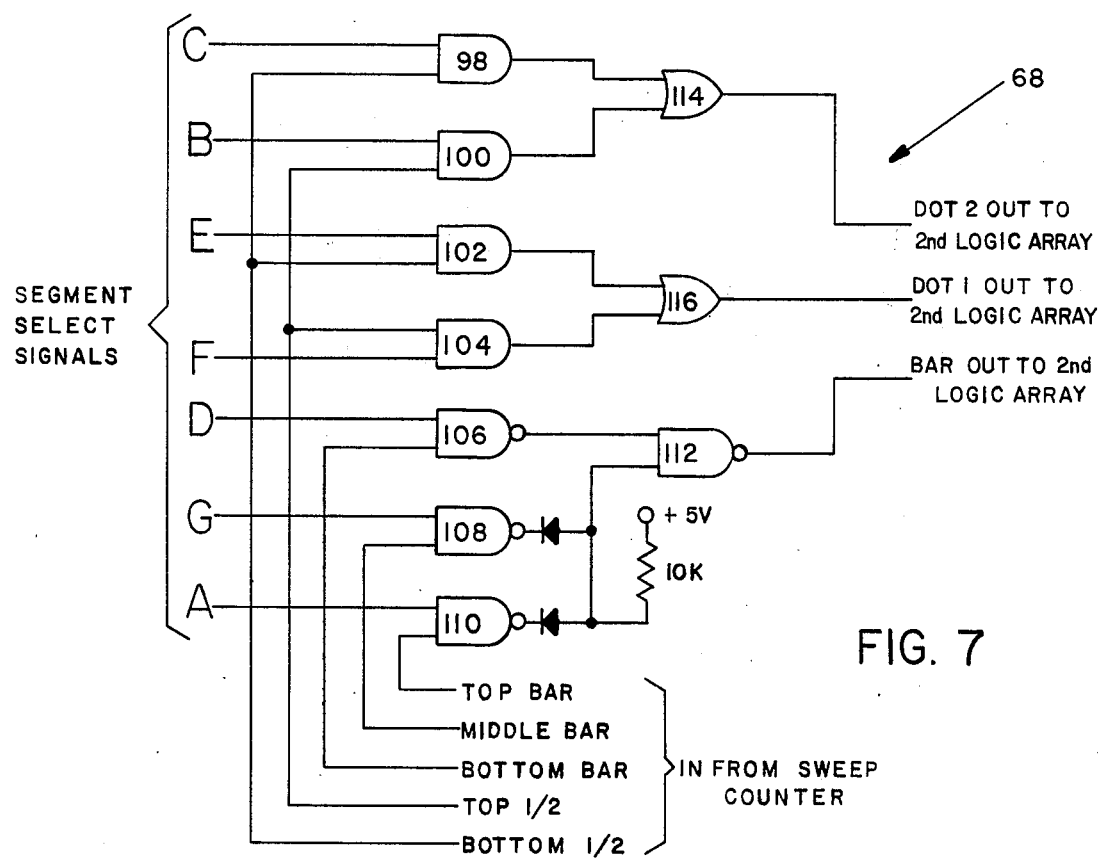
FIG. 7 is a schematic diagram showing a first logic array for the embodiment of FIG. 3.

Referring to FIG. 7, there is shown AND gates 98–104, NAND gates 106–112 and OR gates 114 and 116, which may comprise standard integrated circuit logic elements, connected to form first logic array 68. Logic array 68 performs a logic operation wherein each segment present in a segment select signal from decoder 62 is gated with its correspondent enabling condition from sweep counter 64 to provide DOT 1, DOT 2, and BAR outputs. It will be readily apparent that the BAR output of array 68 will be at logic 1 whenever a logic 1 D bit in a segment select signal coincides with a logic 1 BOTTOM BAR from sweep counter 64, a logic 1 G bit coincides with a logic 1 MIDDLE BAR, or a logic 1 A bit coincides with a logic 1 TOP BAR. The DOT 1 output will be at logic 1 whenever a logic 1 E bit in a segment select signal coincides with a logic 1 BOTTOM ½ or a logic 1 F bit coincides with a logic 1 TOP ½. The DOT 2 output will be at logic 1 whenever a logic 1 C bit coincides with a logic 1 BOTTOM ½, or a logic 1 B bit coincides with a logic 1 TOP ½.

Figure 8:
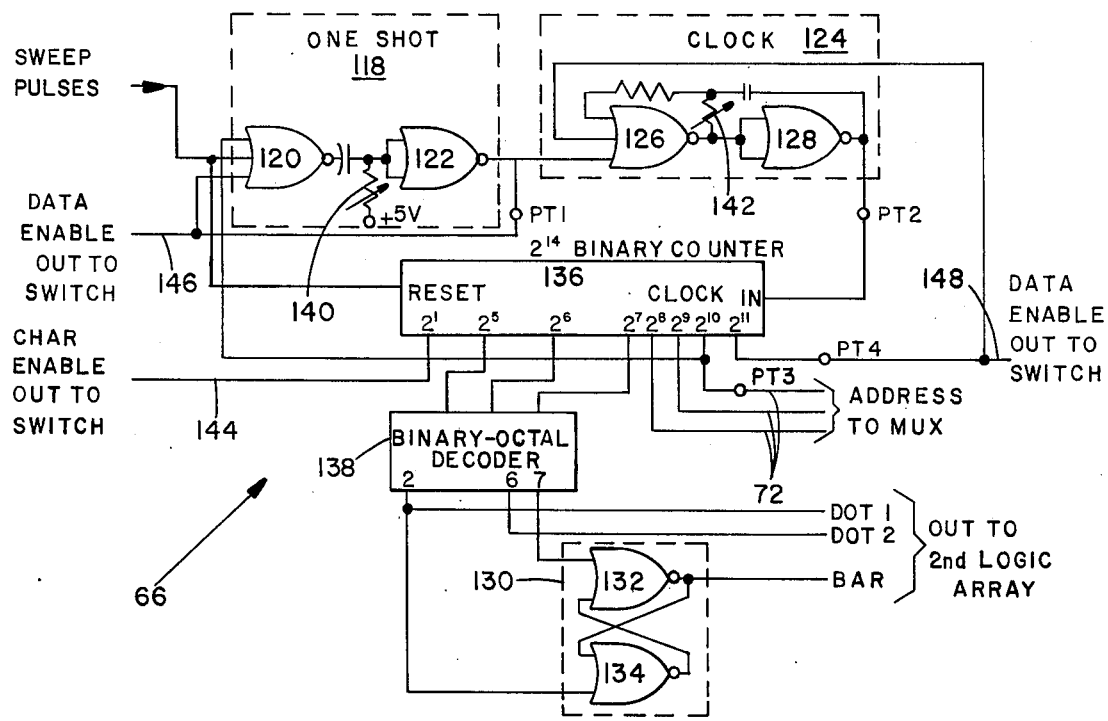
FIG. 8 is a schematic diagram showing a time base for the embodiment of FIG. 3.

Referring to FIG. 8, there is shown one-shot 118 comprising NOR gates 120 and 122, clock 124 comprising NOR gates 126 and 128, and set/reset flip-flop 130 comprising NOR gates 132 and 134, interconnected with $2^{14}$ binary counter 136 and binary-octal decoder 138 to form time base 66. Each of the aforementioned components may comprise a standard integrated circuit element. Successive sweep pulses are coupled to time base 66 from pulse generator 40 whereupon time 66 commences one cycle of operation at the beginning of each sweep of stylus 34.

At each time $T_O$ when a sweep begins, a sweep pulse resets counter 136 and triggers one-shot 118. One-shot 118 thereupon times for a period determined by variable resistor 140, after which it causes clock 124 to commence clocking counter 136. Terminals $2^8$, $2^9$, and $2^{10}$ of counter 136 provide an octal number comprising the aforementioned address code, which is coupled to multiplexer 60 through address lines 72 so that at a time $T_n$ after the beginning of the sweep the address code of the $n^{th}$ character is coupled to multiplexer 60 for a time period $T_D$. Also at time $T_n$, decoder 138, which is coupled to terminals $2^5$, $2^6$, and $2^7$ of counter 136, registers count 2, whereupon flip-flop 130 is set, the BAR and DOT 1 outputs of decoder 138 going to logic 1. The DOT 1 output of decoder 138 goes to logic 0 when count 3 is registered, the DOT 2 output goes to logic 1 when count 6 is registered, and the BAR and DOT 2 outputs go to logic 0 when count 7 is registered, resetting flip-flop 130. If stylus 34 is enabled to form an A, D or G segment whenever the BAR output of flip-flop 138 is logic 1, the aforementioned time period $T_1$ is equal to the time between counts 2 and 7 of decoder 138, $T_1 < T_D$. Similarly, if stylus 34 is enabled to form an E or F segment whenever the DOT 1 output is logic 1 or a B or C segment whenever the DOT 2 output is logic 1, the aforementioned time period $T_2$ is equal to the time between adjacent counts of decoder 138. It may be noted that the time period $T_1$, which determines the width of the graphically represented characters, is dependent on the widths of the pulses from clock 124, which may be adjusted by means of variable resistor 142.

Referring further to FIG. 8, there is shown the 2' terminal of counter 136 coupled to switch 26 through line 144, whereby switch 26 may be enabled to couple the character record signal to recording sytem 10 whenever clock pulses are coupled to counter 136. There is also shown the $2^{10}$ terminal of counter 136 coupled to one-shot 118 to trigger one-shot 118 on the $2^{10}$ count of counter 136. Clock 124 is thereupon disabled for the period of one-shot 118 to provide the aforementioned gap between the fourth and fifth graphically represented characters, which is wider than the gaps between other adjacent characters. The output of one-shot 118 is coupled to switch 26 through line 146 to disable switch 26 from receiving the character record signal whenever one-shot 118 is timing. The 2'' terminal of counter 136 is coupled to clock 124 and also to switch 26 through line 148, disabling clock 124 whenever the 2'' count is registered on a given sweep, and enabling switch 26 to couple data to stylus 34.

Figure 9:
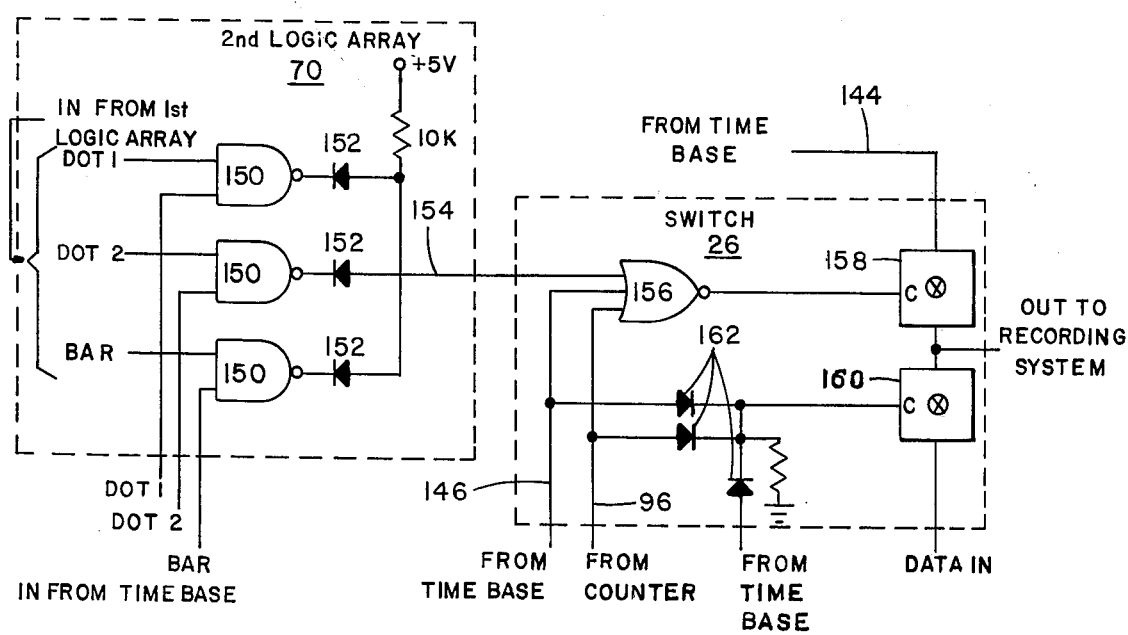
FIG. 9 is a schematic diagram showing a second logic array for embodiment of FIG. 3 coupled to a formatting switch.

Referring to FIG. 9, there is shown second logic array 70 comprising NAND gates 150 and diodes 152, the output thereof being coupled to formatting switch 26 through line 154. It will be readily apparent that the output of logic array 70 will be logic 0 only when a logic 1 output from one of the outputs of first logic array 68 coincides with a logic 1 from the corresponding output of time base 66. Consequently, a logic 0 output of logic array 70 comprises an instruction to stylus 34 to mark medium 28, and the output of logic array 70 comprises an inverted character record signal.

Referring further to FIG. 9, there is shown 3-input NOR gate 156 of formatting switch 26 receiving the inverted character record signal from logic array 70, and also receiving the output of one-shot 118 through line 146 and of terminal 9 of counter 92 through line 96, as hereinbefore described. Character generator 14 may be considered to be in operation whenever counter 92 of sweep counter 64 and clock 124 of time base 66 are operating coincidentally. Since such coincidence of operation requires that the output of one-shot 118 and of terminal 9 of counter 92 both be logic 0, the output of NOR gate 156 comprises the inverse of the output of logic array 70, and therefore comprises the character record signal, whenever generator 14 is in operation. Coincident with the generation of the character record signal, switch 158 is enabled by terminal 2' of counter 136 to couple the character record signal to recording system 10. Also, switch 160 is disabled by the logic 0 states on line 96 and 196 whereupon data from data source 12 is uncoupled from recording system 10, interrupting the representation thereof.

If either one-shot 118 is timing, counter 136 has reached count 2", or counter 92 has reached count 9, whereupon character generator 14 may not be in operation, switch 160 is enabled through a diode 162 to couple data to recording system 10.

While the embodiment hereinbefore described pertains to numerical characters contained in a digital signal, it is anticipated that one skilled in the art could readily adapt the principles of the invention to graphically represent alphabetical or other sorts of characters.

Obviously, many modifications and variations of the present invention are possible in the light of the above teachings, and, it is therefore understood that within the scope of the disclosed inventive concept, the invention may be practiced otherwise than as specifically described.

What is claimed is:

1. An apparatus for graphically representing one or more characters encoded in a digital signal, wherein each of said characters may be graphically represented by combining selected discrete segments included in a group of segments, wherein each of the segments of said group is required to represent at least one of said encoded characters, said apparatus comprising:
   a recording means comprising a writing element and a recording medium wherein said writing element is adapted to sweep across said recording medium at selected intervals;
   a timing means associated with said recording means to enable said writing element to selectively mark said recording medium during a selected series of sweeps;
   means receiving said digital signal for recognizing each of the discrete segments which in combination are required to form a given one of said encoded characters, and for providing a plurality of segment pulses, each of said segment pulses identifying a different one of said recognized discrete segments;
   a network of logic elements coupled to said timing means and to said segment recognition means for providing a character record signal which is coupled to said writing element to cause said writing element to selectively mark said recording medium during said series of sweeps, whereby the segments for representing each of said characters is formed.

2. The apparatus of claim 1 wherein:
   said segment recognition means includes means for simultaneously providing said plurality of segment pulses, said plurality of segment outputs comprising a segment select signal.

3. The apparatus of claim 2 wherein:
   said timing means includes a sweep counter means for generating a plurality of discrete sweep counter outputs during said series of sweeps, each of said sweep counter outputs being generated only during sweeps included in a corresponding sweep set,
   each of said sweep sets comprising a plurality of sweeps of said series,
   each of said sweep sets comprising a number of sweeps which is less than the number of sweeps in said series,
   and every sweep in said series being included in at least one of said sweep sets.

4. The apparatus of claim 3 wherein: said timing means further includes a time base for generating a plurality of segment enable time periods during a character representation time period, the time durations of at least two of said segment enable time periods being different.

5. The apparatus of claim 4 wherein: said network of logic elements includes a first logic array simultaneously receiving all of the segment pulses of one of said segment select signals and also receiving said sweep counter outputs for providing a plurality of first logic array outputs, each of said first logic array outputs enabling a given one of said segments to be formed only during a given one of said sweep sets.

6. The apparatus of claim 5 wherein: said network of logic elements further comprises a second logic array coupled to said time base and also to said first logic array for providing said character record signal only during a given one of said plurality of segment enable time periods.

7. The apparatus of claim 6 wherein said apparatus receives numerical characters encoded in binary coded decimal form in a digital signal, and wherein: said segment recognition means comprises means for recognizing each of the segments from a group of seven segments that are required to represent each of said encoded numerical characters.

8. The apparatus of claim 7 wherein: said segment recognition means comprises a multiplexing means and a decoder, said multiplexing means receiving said digital signal for sequentially switching each of the characters encoded in said digital signal to said decoder for providing one of said segment select signals for each of said encoded characters.

9. The apparatus of claim 6 wherein: said apparatus includes a switch for selectively coupling to said writing element said character record signal and data from a source of data, there being some relationship between said data and characters encoded in said digital signal.

10. The apparatus of claim 8 wherein: said time base includes means for generating an address code during each sweep of said series of sweeps, said address code being coupled to said multiplexing means to sequentially provide the said segment select signal required to represent each of said encoded characters.

* * * * *